United States Patent
Ergler et al.

(10) Patent No.: US 10,823,863 B2
(45) Date of Patent: Nov. 3, 2020

(54) ASSEMBLY METHOD FOR PRODUCING AN X-RAY DETECTOR, X-RAY DETECTOR AND X-RAY DEVICE

(71) Applicant: Siemens Healthcare GmbH, Erlangen (DE)

(72) Inventors: Thorsten Ergler, Erlangen (DE); Miguel Labayen De Inza, Forchheim (DE); Jan Wrege, Erlangen (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 0 days.

(21) Appl. No.: 16/244,496

(22) Filed: Jan. 10, 2019

(65) Prior Publication Data
US 2019/0227182 A1    Jul. 25, 2019

(30) Foreign Application Priority Data
Jan. 19, 2018 (DE) .......... 10 2018 200 845

(51) Int. Cl.
| | |
|---|---|
| *G01T 1/20* | (2006.01) |
| *G01T 7/00* | (2006.01) |
| *G01T 1/24* | (2006.01) |

(52) U.S. Cl.
CPC .............. *G01T 7/00* (2013.01); *G01T 1/2018* (2013.01); *G01T 1/243* (2013.01)

(58) Field of Classification Search
CPC ......... G01T 7/00; G01T 1/243; G01T 1/2018; G01T 1/244; G01T 1/24; A61B 6/03
See application file for complete search history.

(56) References Cited

U.S. PATENT DOCUMENTS

| | | | |
|---|---|---|---|
| 5,856,699 A | 1/1999 | Hayashi et al. | |
| 6,990,176 B2 * | 1/2006 | Sherman ................ | A61B 6/032 250/370.09 |

(Continued)

FOREIGN PATENT DOCUMENTS

| | | |
|---|---|---|
| DE | 69636404 T2 | 2/2007 |
| DE | 102014213734 A1 | 2/2016 |

(Continued)

OTHER PUBLICATIONS

"Sondermetalle"; in: OS Materials, Version of: Oct. 12, 2017; http://www.os-materials.com/printable/produkte/sondermetalle/index.html.

(Continued)

*Primary Examiner* — Kiho Kim
(74) *Attorney, Agent, or Firm* — Harness, Dickey & Pierce, P.L.C.

(57) ABSTRACT

An inventive assembly method is for the production of an x-ray detector. In an embodiment, the method includes positioning a plurality of sensor surface elements, formed from an x-ray radiation-sensitive material, on an assembly carrier; placing an interposer on a contact side of each of the plurality of sensor surface elements, divided into a plurality of pixels and arranged opposite the assembly carrier, such that respective contact elements arranged on a mating contact side of the interposer, facing towards respective ones of the plurality of sensor surface elements, each contact a pixel; and respectively putting evaluation circuits on a circuit side of the interposer, opposite to the mating contact side of the interposer, for each of the plurality of sensor surface elements.

28 Claims, 9 Drawing Sheets

(56) References Cited

U.S. PATENT DOCUMENTS

| | | | |
|---|---|---|---|
| 7,462,831 B2* | 12/2008 | Gooch | G01J 5/20 250/338.1 |
| 9,337,233 B1* | 5/2016 | Palit | H01L 27/14663 |
| 9,651,683 B2* | 5/2017 | Ootorii | H01L 27/14663 |
| 2004/0109299 A1* | 6/2004 | Burdick, Jr. | H04N 3/1593 361/788 |
| 2006/0185165 A1 | 8/2006 | Kautzer et al. | |
| 2007/0131868 A1* | 6/2007 | Capote | H01L 27/14636 250/370.13 |
| 2009/0080601 A1* | 3/2009 | Tkaczyk | G01T 1/249 378/19 |
| 2010/0155612 A1 | 6/2010 | Inoue | |
| 2012/0049079 A1* | 3/2012 | Yanoff | G01T 1/244 250/370.13 |
| 2012/0133001 A1* | 5/2012 | Tkaczyk | H01L 27/20 257/414 |
| 2013/0176552 A1* | 7/2013 | Brown | H05K 13/00 356/51 |
| 2014/0015081 A1 | 1/2014 | Luhta | |
| 2015/0060676 A1* | 3/2015 | Couture | G01T 1/2018 250/366 |
| 2016/0015339 A1 | 1/2016 | Danzer et al. | |
| 2016/0116610 A1* | 4/2016 | Labayen De Inza | G01T 1/243 250/370.14 |
| 2016/0148965 A1* | 5/2016 | Clayton | H01L 27/14634 257/293 |
| 2016/0170032 A1 | 6/2016 | Danzer et al. | |
| 2016/0259068 A1* | 9/2016 | So | G01T 1/2018 |
| 2017/0230597 A1* | 8/2017 | Fahim | H04N 5/378 |
| 2018/0120447 A1 | 5/2018 | Ergler et al. | |
| 2018/0210096 A1 | 7/2018 | Luhta et al. | |

FOREIGN PATENT DOCUMENTS

| | | |
|---|---|---|
| DE | 102014221829 A1 | 4/2016 |
| DE | 102014225396 B3 | 4/2018 |
| DE | 10 2016 221 481 A1 | 5/2018 |
| WO | WO 2017014798 A1 | 1/2017 |

OTHER PUBLICATIONS

Braml H.: "Entwicklung und Herstellung von photonenzählenden (Cd,Zn)Te-Pixel-Röntgendetektoren für die medizinische Bildgebung"; Dissertation; 2006, Fakultät für Chemie, Pharmazie und Geowissenschaften der Albert-Ludwigs-Universität Freiburg i. Br.

German Office Action for German Application No. 10-2018 200 845, dated Sep. 14, 2018.

Special Metals, pp. 1-4, 2008.

* cited by examiner

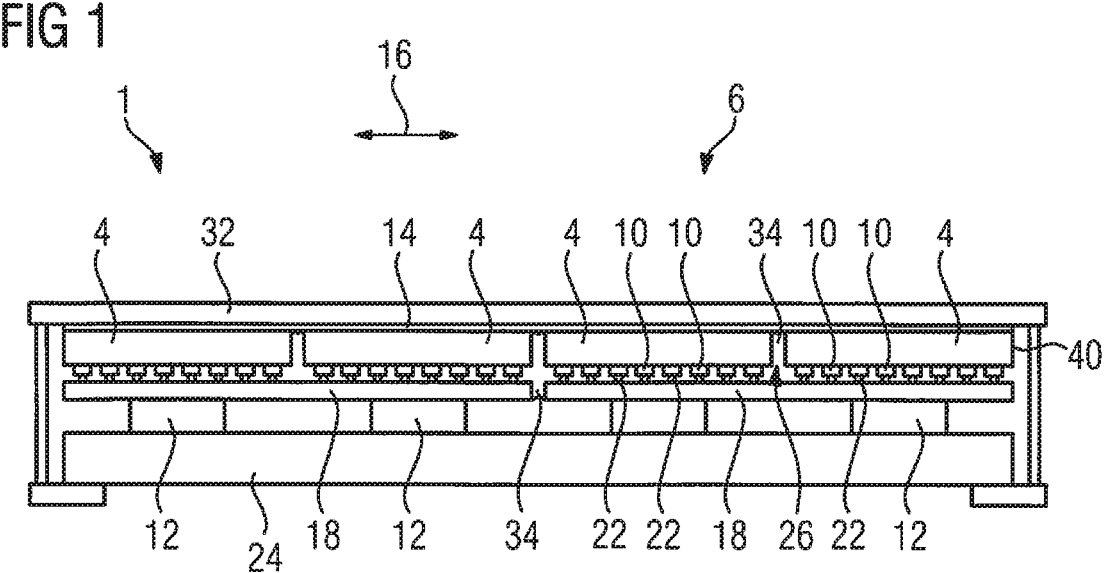
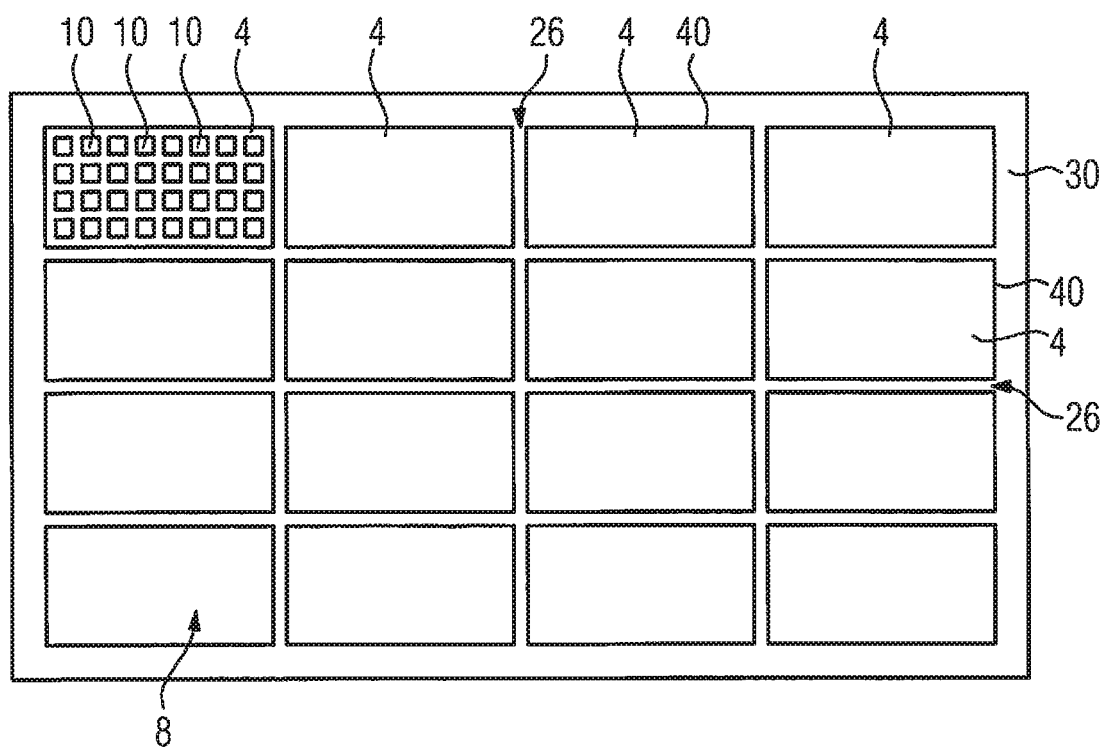

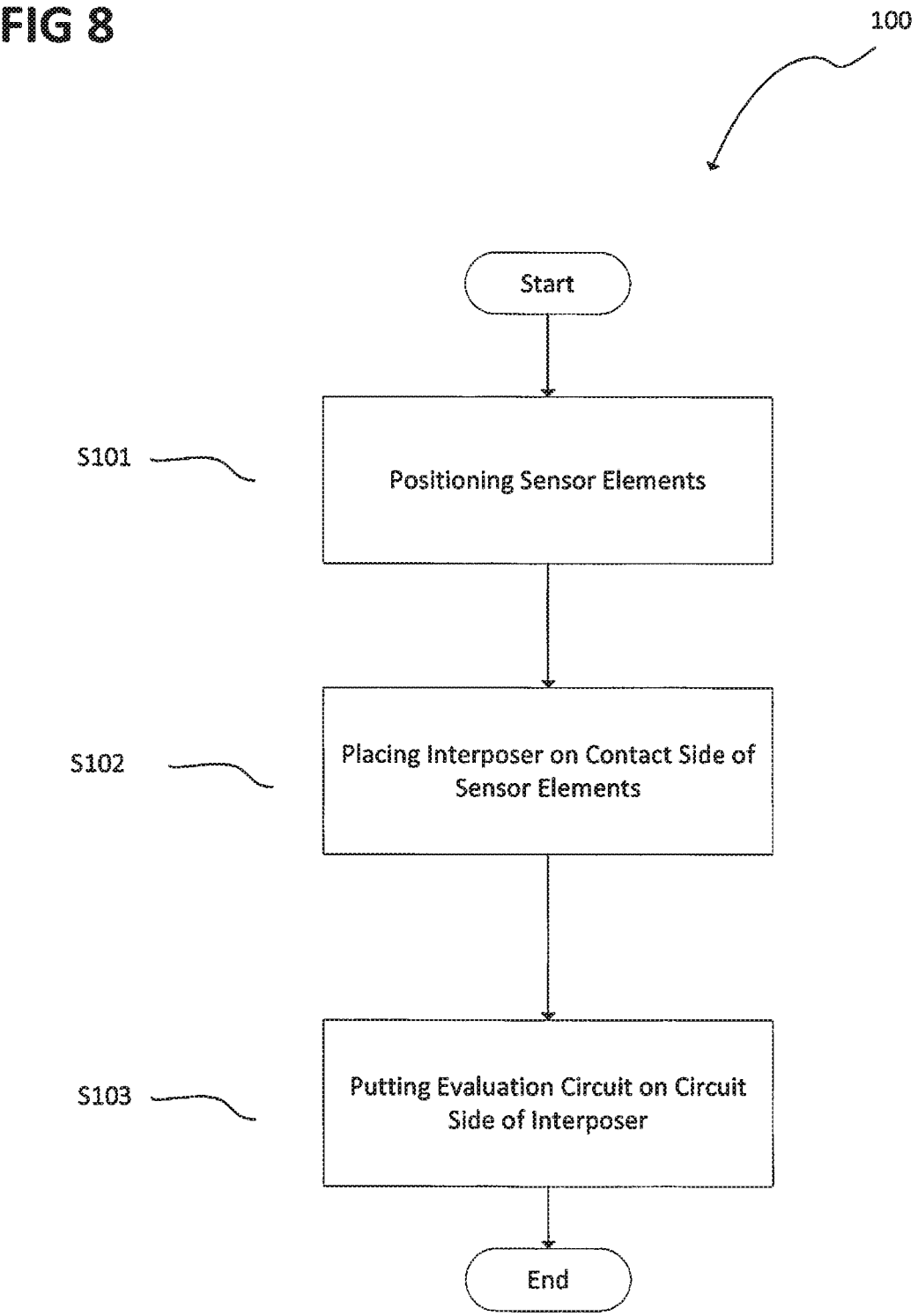

ASSEMBLY METHOD FOR PRODUCING AN X-RAY DETECTOR, X-RAY DETECTOR AND X-RAY DEVICE

PRIORITY STATEMENT

The present application hereby claims priority under 35 U.S.C. § 119 to German patent application number DE 102018200845.0 filed Jan. 19, 2018, the entire contents of which are hereby incorporated herein by reference.

FIELD

Embodiments of the invention generally relate to an assembly method for producing an x-ray detector as well as to an x-ray detector produced according to this method. Furthermore, embodiments of the invention generally relate to an x-ray device with such an x-ray detector.

BACKGROUND

Modern x-ray imaging devices (x-ray devices for short) usually comprise an x-ray radiation detector (x-ray detector for short), which serves to detect incident x-ray radiation and to output a measurement signal characteristic for the incident x-ray radiation. Subsequently an x-ray image usually is created from this measurement signal via an image processor assigned to the x-ray imaging device.

In this case the x-ray detector usually has a layer sensitive to x-ray radiation and a downstream evaluation circuit (or detection circuit). Currently there are two different kinds of materials sensitive to x-ray radiation being used. With the so-called scintillator materials photons are created by the incident x-ray radiation, which are detected in their turn by photodiodes of the evaluation circuit. These materials are formed by selenium, cesium iodide or the like for example. With so-called direct-converting materials a charge carrier (usually an electron-hole pair) is created by incident x-ray radiation, which is "extracted" to the evaluation circuit by a voltage applied to a layer formed by the material and is thus detected by the circuit. This enables comparatively small radiation intensities to be detected, which is why an x-ray detector constructed from such a material is also commonly referred to as a quantum-counting detector. These types of direct-converting materials are cadmium telluride, gallium arsenide and the like.

The publication DE 10 2014 213 734 A1 discloses an imaging facility for electromagnetic radiation, in particular for x-ray and/or Gamma radiation, which comprises a coating of a number of detection elements, a number of readout boards, and a base board, wherein the detection element or each detection element is electrically contacted with one readout board in each case via a plurality of first solder contacts, wherein the readout board or each readout board has a plurality of through-hole contacts, and wherein the readout board or each readout board is electrically contacted with the base board via a plurality of second solder contacts.

The publication DE 10 2014 221 829 A1 discloses a method for producing a sensor board for a detector module, wherein a plurality of readout units are provided, wherein the readout units are positioned in a stack structure in each case on a common sensor layer, and wherein, after all readout units have been positioned, these are fixed jointly to the sensor layer to form a hybrid.

The publication DE 10 2014 225 396 B3 discloses sensor board for a detector module, comprising, in a stack structure, at least one readout unit and a sensor layer arranged in the stack direction at a distance from the readout unit, wherein the sensor layer, in a longitudinal direction transverse to the stack direction, in at least one edge area, projects beyond the readout unit, wherein the space present as a result of the distance between the sensor layer and the readout unit is filled with a hardened filler material such that at least one edge area of the sensor layer is free from the filler material.

SUMMARY

The inventors have recognized that to also be able to embody the also comparatively large detector surfaces (for example 20×20 $cm^2$ and more) in particular with direct-converting material, the entire (sensitive) detector surface of an x-ray detector is mostly formed from a number of smaller detector elements arranged next to one another (the x-ray detector is "tiled"). Each of the detector elements is formed from a so-called "hybrid" in this case. In concrete terms each detector element comprises a wafer made of x-ray-sensitive material, to the underside of which the assigned evaluation circuit is linked.

The inventors have recognized that with direct-converting materials, a plurality of pixels is put onto the underside of the wafer in the form of metalized connection points. With these the evaluation circuit is usually contacted for the purposes of signal transmission via an intermediate layer, usually soldered. These hybrids are arranged next to one another on a substrate, which mostly also represents collective (signal) electronics for all hybrids.

The inventors have recognized that because of the assembly tolerances for component placement on the substrate and also during contacting, in particular soldering the evaluation circuits to the x-ray-sensitive wafers, gaps between the individual x-ray-sensitive wafers of adjacent hybrids cannot be kept below a required value with sufficient certainty. Frequently gap dimensions occur that have roughly the size of a pixel. This is equivalent, seen over the detector surface, to a missing (or failed) pixel row, which in its turn leads to "blind" image areas and/or to undesired image artifacts. The inventors have recognized that this is undesirable in x-ray imaging.

At least one embodiment of the invention is directed to making improved x-ray imaging possible.

An embodiment of the invention is directed to an assembly method. Furthermore an embodiment of the invention is directed to an x-ray detector. Moreover, an embodiment of the invention is directed to an x-ray device. Forms of embodiment and developments of the invention that are advantageous and in some cases inventive in their own right are set out in the dependent claims and in the description given below.

An embodiment of the invention is directed to an inventive assembly method, used for the production of an x-ray detector. In accordance an embodiment of the method, a plurality of sensor surface elements formed from an x-ray radiation-sensitive material are positioned on an assembly carrier. Placed on one contact side of each of the sensor surface elements, opposite to the assembly carrier, divided into a plurality of pixels (i.e. individual picture elements) is an interposer, such that contact elements arranged on a mating contact side of the interposer facing towards the sensor surface elements contact a pixel in each case. On a circuit side of the interposer opposite to the mating contact side of the interposer an evaluation circuit is put on for each sensor surface element in each case, preferably such that, on the respective evaluation circuit in the final assembly state in accordance with specification, the pixels of the assigned sensor surface element are brought together in each case.

An embodiment of the invention is directed to an inventive assembly method for production of an x-ray detector, the assembly method comprising:

positioning a plurality of sensor surface elements, formed from an x-ray radiation-sensitive material, on an assembly carrier;

placing an interposer on a contact side of each of the plurality of sensor surface elements, divided into a plurality of pixels and arranged opposite the assembly carrier, such that respective contact elements arranged on a mating contact side of the interposer, facing towards respective ones of the plurality of sensor surface elements, each contact a pixel; and respectively putting an evaluation circuit on a circuit side of the interposer, opposite to the mating contact side of the interposer, for each respective sensor surface element of the plurality of sensor surface elements.

An embodiment of an inventive x-ray detector is produced according to an embodiment of the assembly method described above and thus has the features and also advantages described in conjunction with at least one embodiment of the inventive assembly method.

An embodiment of an inventive x-ray device, for example a C-arm x-ray device, has an embodiment of the x-ray detector described here. An embodiment of the inventive x-ray device also shares the features as well as the advantages described above in conjunction with an embodiment of the inventive assembly method.

BRIEF DESCRIPTION OF THE DRAWINGS

Example embodiments of the invention will be described below in greater detail with reference to a drawing. In the figures:

FIG. 1 shows an x-ray detector in a schematic side view,

FIG. 2 shows sensor surface elements of the x-ray detector in a partly assembled state in a schematic overhead view, FIG. 8 shows a flow diagram of an embodiment of the method.

Parts that correspond to one another are always labeled with the same reference characters in all figures.

DETAILED DESCRIPTION OF THE EXAMPLE EMBODIMENTS

Figure 3:
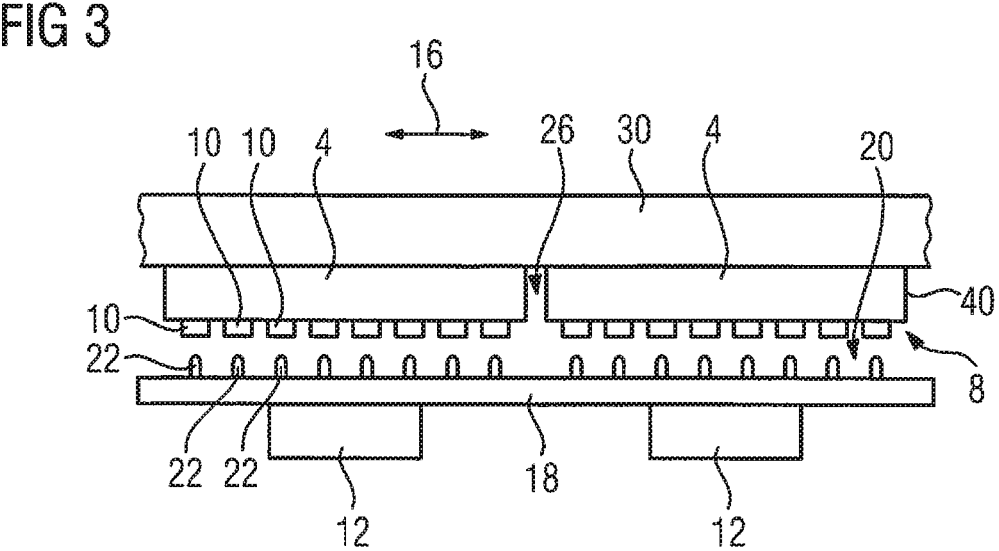
FIG. 3 shows the x-ray detector in a further partly assembled state in an enlarged, schematic detailed view seen from the side.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Most of the aforementioned components, in particular the identification unit, can be implemented in full or in part in the form of software modules in a processor of a suitable control device or of a processing system. An implementation largely in software has the advantage that even control devices and/or processing systems already in use can be easily upgraded by a software update in order to work in the manner according to at least one embodiment of the invention.

An embodiment of the invention is directed to an inventive assembly method, used for the production of an x-ray detector. In accordance an embodiment of the method, a plurality of sensor surface elements formed from an x-ray radiation-sensitive material are positioned on an assembly carrier. Placed on one contact side of each of the sensor surface elements, opposite to the assembly carrier, divided into a plurality of pixels (i.e. individual picture elements) is an interposer, such that contact elements arranged on a mating contact side of the interposer facing towards the sensor surface elements contact a pixel in each case. On a circuit side of the interposer opposite to the mating contact side of the interposer an evaluation circuit is put on for each sensor surface element in each case, preferably such that, on the respective evaluation circuit in the final assembly state in accordance with specification, the pixels of the assigned sensor surface element are brought together in each case.

The term "x-ray radiation-sensitive" is understood here and below in particular as the corresponding material giving rise through the incidence of x-ray radiation to a reaction able to be sensed (in particular via the evaluation circuit). Basically a scintillator material can be involved in such cases. Especially preferably a material directly converting x-ray radiation, such as e.g. cadmium telluride, gallium arsenide or the like is involved.

The term "sensor surface element" is understood here and below in particular as this element formed (from the x-ray radiation-sensitive material), when assembled in its final state as per specification, forming a part of the overall "active" or sensitive sensor surface of the x-ray detector.

The term "interposer" is understood here and below in particular as an intermediate layer that serves to make possible a contacting between the individual pixels of the respective sensor surface elements and the respective input channels of the respectively assigned evaluation circuits. Optionally the respective interposer in such case also features a spatial diversion of the conductor tracks assigned to the individual pixel and to the respective input channel. In particular the interposer thus forms a type of carrier and contacting medium for the evaluation circuits.

Preferably the respective sensor surface element is fixed before the interposer is placed on the assembly carrier.

Further preferably each of the pixels is formed by an electrically conductive contact surface, i.e. in particular a metallic electrode.

The sensor surface elements initially being arranged independently of one another, and in particular of the evaluation circuits, on the assembly carrier enables the sensor surface elements advantageously to be aligned with smaller tolerances—which in particular are only subject to a positioning tolerance of a pick and place facility—and in particular are also aligned with a smaller gap from one another than if the sensor surface elements are already combined beforehand into a hybrid with the respective evaluation circuit. Blind spots or (x-ray image) artifacts as a result of the gap between the individual sensor surface elements can thus be reduced. In particular gaps between the individual sensor surface elements can be kept to less than 40 micrometers (μm).

For fixing the sensor surface elements the assembly carrier is designed as self-adhesive for example. As an alternative the individual sensor surface elements will be fixed to the assembly carrier for example by applying a vacuum between the sensor surface elements and the assembly carrier (for example by appropriate holes made in the assembly carrier) or by gluing (for example via adhesive applied between the sensor surface elements and the assembly carrier).

Basically, by way of the assembly method, x-ray detectors (bent into a curved shape) can also be produced for a computed tomograph. Preferably however the assembly method is used for the production of a so-called flat-panel detector, i.e. of an x-ray detector flat across its detector surface, which is used for example in a mammography angiography x-ray device or the like.

In a preferred version, the contact between the respective sensor surface element and the interposer is made without solder. Preferably the electrical contacting is embodied by a mechanical contacting, for example by pressing together the pixels and the assigned contact elements. Dispensing with a solder process between the sensor surface elements and the interposer enables influences on a positioning tolerance through shifts caused by soldering processes or the like to be avoided, or in any event at least significantly reduced.

In an expedient version, a cover element is arranged on the circuit side, which covers (preferably all of) the evaluation circuits. In particular this cover element involves a substrate, which carries the entire structure of evaluation circuits, interposer and sensor surface elements. Preferably the cover element at least involves a (ceramic or "organic") printed circuit board, which optionally carries electronic circuits and which in particular serves as "collective electronics" for bundling and forwarding the measurement signals output by the evaluation circuits to a superordinate evaluation unit, for example an image processor. The cover element is further preferably connected to the evaluation circuits and/or the interposer. After they have been applied, the assembly carrier is removed from the sensor surface elements. Before or after the removal of the assembly carrier a force transmission element is put onto the sensor surface elements (or the assembly carrier). By use of this force transmission element, an assembly force is applied to the sensor surface elements to form the electrically conductive connection (contacting) with the interposer. Optionally the contact elements of the interposer are connected in this case to the respective pixels in a kind of pressure welding connection.

In a further expedient version, a voltage connection element is applied to the sensor surface elements via the assembly carrier. In this case the voltage connection element remains on the sensor surface elements on removal of the assembly carrier. The voltage connection element serves to apply the "extraction voltage" (with voltage values in the range of for example −1000 V) to the sensor surface elements formed from the direct-converting material. For example the voltage connection element involves an electrically conductive layer, for example a film, a flexible printed circuit board or the like.

As an alternative the voltage connection element is put on in a separate assembly step after the removal of the assembly carrier or as a part of the force transmission element.

Preferably the interposer covers a number of sensor surface elements and thus in particular also carries a number of evaluation circuits. Optionally only one interposer is employed for all sensor surface elements. As an alternative a number of interposers, preferably of the same type (in respect of the dimensions and the number of evaluation circuits put on) are employed for contacting all sensor surface elements.

In an expedient version, the respective evaluation circuit is installed on the respective interposer and contacted with the interposer before the respective interposer is placed on the contact side of the respective sensor surface element. Optionally the respective evaluation circuit is soldered to the interposer in this case. Advantageously an assembly module (also referred to as an interposer unit), which simplifies the handling of the evaluation circuit, is formed by this.

The evaluation circuit preferably involves an application-specific integrated circuit (ASIC), in which a functionality for detecting the incident x-ray radiation falling onto the respective sensor surface element and creating a corresponding measurement signal is implemented by way of circuit technology.

Preferably the respective evaluation circuit, seen in the planar direction, is smaller than the respective assigned surface element. In this case the interposer in particular serves to divert the individual conductor tracks assigned to the pixels to the input channels of the evaluation circuit.

In a version advantageous in respect of the distribution of the pixels of all sensor surface elements, the contact side of each of the sensor surface elements is only subdivided into the individual pixels after the positioning (and in particular fixing) on the assembly carrier. I.e. the electrode forming the respective pixel will only be put onto the respective sensor surface element after the positioning in particular of all sensor surface elements on the assembly carrier.

Preferably all pixels of the x-ray detector are distributed in such cases with a predetermined, fixed grid, in particular a grid independent of the sensor surface elements over all sensor surface elements, also referred to as a "global" grid. This produces an especially uniform (regular) distribution of the pixels over the entire surface of the x-ray detector, which is in particular also independent of positional fluctuations of the sensor surface elements and moreover contributes to a high image quality.

Basically in such cases, because of fluctuations in the positioning of the sensor surface elements however, pixels can still be arranged at least in some cases in the gap between two sensor surface elements. Because of the advantageously especially small gap (preferably <40 μm) between the individual sensor surface elements, there is a high probability of at least a part of such a pixel being arranged on one of the two sensor surface elements.

A "cut-off" pixel of this type at the edge of a sensor surface element however still delivers such a large contribution to the measurement signal that artifacts can still be reduced. Thus, for example, pixels reduced by 20 to 30 percent are sufficiently large for an acceptable image quality of the (x-ray) image created via the x-ray detector. For the case in which the gap dimensions and the positioning tolerances of the sensor surface elements associated therewith can be lowered to a dimension below the distance of the individual pixels from one another, the slight restrictions imposed by cut-off pixels can also be reduced—at least with alignment of the pixel grid to the sensor surface elements.

In an optional development, within the global grid previously described, the distance of the pixels from one another at the points at which there is a high probability of a gap between two sensor surface elements, is enlarged slightly (i.e. by 10-50%, preferably by up to 30% of the distance). With only slight adverse effects on image quality, this enables a risk that a pixel (in particular a row of pixels or column of pixels) would be arranged completely in the gap between two sensor surface elements and thus that a completely "blind" point would be present, (in particular even under the additional assumption that cut-off pixels can occur) to be further reduced.

In a preferred version, the individual pixels, in particular in the case of subsequent application of the pixels (i.e. after the positioning of the sensor surface elements on the assembly carrier), are embodied by electroless metallization. Preferably a lithographic method, in particular a lithographic "opening" of the individual pixel surfaces in a protective layer put onto the respective sensor surface element is employed in this case. Each individual pixel, in concrete terms each electrode forming the pixel, will preferably be embodied in this case only in the opened area of the protective layer on the respective sensor surface element (in particular deposited as a metallic layer). Optionally the protective layer involves a lithography lacquer or a cover film, in particular what is referred to as a dry film.

In order to make possible an especially simple and where possible automatic alignment of the individual sensor surface elements in relation to one another, the (in particular all) sensor surface elements are placed on the assembly carrier or on an additional intermediate carrier (i.e. a further assembly carrier for intermediate installation of the sensor surface elements). Arranged on the assembly carrier or the intermediate carrier in this case are two installation strips adjacent to one another and aligned at a (preferably 90°) angle in relation to one another, which preferably form a stop edge in each case.

For positioning on the assembly carrier or the intermediate carrier, the sensor surface elements are then pushed against these installation strips. For example the sensor surface elements in this case are pushed in particular in column and row direction of the sensor surface elements into contact with the installation strips and in particular also with one another. Through this the gap between the sensor surface elements is reduced to a dimension dictated by manufacturing tolerances in the shaping of the sensor surface elements in an especially simple manner—in particular by a self-alignment of the sensor surface elements to one another and to the installation strips (with outer edges of rectangular sensor surface elements running exactly in a straight line and aligned at right angles to one another the gaps can be closed). Advantageously this enables a pick-and-place facility (a "component placer") for positioning the sensor elements on the assembly carrier to be dispensed with.

Subsequently the sensor surface elements, positioned optionally on the intermediate carrier as previously described, will be transferred onto the assembly carrier (put onto the latter), for example by the carrier being placed onto the sensor surface elements and the intermediate carrier. The sensor surface elements are then fixed to the assembly carrier. This is advantageous for example if the installation strips get in the way of the subsequent assembly steps.

In order to simplify the movement of the sensor surface elements on the assembly carrier or the intermediate carrier described above, the sensor surface elements are supported and moved on a fluid. Through this the friction between the sensor surface elements and the assembly carrier or the intermediate carrier is significantly reduced, so that the sensor surface elements can slide especially smoothly on the assembly carrier or the intermediate carrier. Preferably the elements are moved in particular in this case by tilting the assembly carrier or the intermediate carrier in the direction of the two installation strips. This further simplifies the positioning, since a direct manipulation of the sensor surface elements (for example by "gripping" them or at least by direct contact via a manipulator) can be dispensed with.

Optionally a gas (for example air) is blown in as the fluid through corresponding openings in the assembly carrier or the intermediate carrier, so that the sensor surface elements "float" on an air cushion. Optionally in this case the openings in particular in the assembly carrier are used after the alignment to fix the sensor surface elements to the assembly carrier by applying a vacuum at the openings.

In an alternate variant a liquid (for example an alcohol, an oil or the like) is employed as the fluid. This liquid regularly rises up in such cases because of capillary effects and/or the surface tension at the outer edges of the sensor surface elements and can thus act as a kind of collision protection or damper, so that damage to the outer edges of the sensor surface elements through direct contact with one another or with the installation strips can be avoided.

In order to make possible the fullest possible surface coverage of the entire sensor surface of the x-ray detector with the sensor surface elements with the fewest possible and the smallest possible gaps, the sensor surface elements are measured in an advantageous embodiment before being positioned. Subsequently the sensor surface elements are placed on the assembly carrier or the intermediate carrier sorted as a function of their external dimensions. This variant is in particular expedient within the framework of the movement of the sensor surface elements against the installation strip described above, since gaps can occur here through different sizes of the sensor surface elements. A sorting algorithm is optionally employed here, via which an arrangement of sensor surface elements selected from a larger number of sensor surface elements than is required for the "tiling" of the x-ray detector to fill the surface as fully as possible is calculated. Preferably in this case sensor surface elements as equal in size as possible, i.e. in particular with deviations of less than 20 µm between them, are selected for tiling of an x-ray detector.

In a version alternate or also optionally additional to the sorting of the sensor elements described above, the sensor surface elements are trimmed along their outer edges so that in each case two adjacent sensor surface elements are simultaneously trimmed at their outer edges facing towards one another. This trimming is preferably carried out in such cases after the placement of the sensor surface elements on the assembly carrier or the intermediate carrier (or where necessary a further sawing jig). In particular the sensor surface elements are placed next to one another as per specifications (preferably on the respective carrier) and subsequently trimmed with a saw. Preferably the sensor surface elements arranged in the form of an array are trimmed in this case in accordance with column and row, so that a row or column along a number of sensor surface elements is "moved through" in one trimming step. Through this simultaneous (two-sided in relation to the direction of advance of the trimming tool, in concrete terms the saw blade) trimming of two sensor surface elements, "equivalent" outer edges will advantageously be created on the two, which can be placed precisely against one another. This in turn enables the gap dimension between these sensor surface elements to be reduced. In particular the tolerances of the trimming on the adjacent sensor surface elements mostly act as a mirror image.

Preferably the sensor surface elements are shaped, i.e. cut in concrete terms, before being placed on the assembly carrier or the intermediate carrier (and before the trimming described above) with a trimming surplus. "Trimming surplus" is understood in particular in this case as the sensor surface elements being produced with larger dimensions, but at least with coarser tolerances than the standard or target tolerances in the direction of larger outer dimensions, so that the sensor surface elements, in this untrimmed state, are larger than is specified for the final assembly state.

In a further expedient version, gaps between the individual sensor surface elements, which occur during positioning of the sensor surface elements on the assembly carrier, before the placement of the interposer or the respective interposers (and preferably also before the subsequent embodiment of the pixels) are filled with a first, wetting filler material (also referred to as a so-called "underfill"). This first underfill in particular involves a wetting polymer (i.e. in particular a duroplast), for example an epoxy resin, an acrylate or the like. Through this first underfill the sensor surface elements are advantageously fixed spatially in relation to one another and the gap between the elements is closed. This enables such situations to be prevented as media, for example a further (second) underfill introduced later for underpinning the respective interposer on the sensor surface elements, penetrating between the individual sensor surface elements. Moreover it can advantageously be prevented or at least ameliorated that further components and/or such a second underfill induces mechanical stresses into the sensor surface elements when hardening, which can lead to an undesired signal instability ("drift spot") under x-ray load.

In an advantageous development the liquid for fluid-supported movement of the sensor surface elements is employed as the first underfill. This liquid involves an artificial resin for example, preferably with low viscosity, which advantageously hardens triggered by the application of heat. Thus the sensor surface elements can be aligned without any risk of exceeding the stated pot life of the artificial resin (the time when the artificial resin moves from the liquid into the gel-like and thus spatially bound state) and the hardening of the artificial resin will only be "started" after the positioning of the sensor surface elements. The use of the (non-hardened) first underfill for sliding support of the sensor surface elements advantageously enables savings to be made in process steps and material. Optionally there is a cleaning of the contact surfaces of the sensor surface elements after the hardening and before the possible subsequent embodiment of the pixels. For example a suitable etching device(s) or a solvent is used for cleaning.

In an expedient version an in particular slightly electrically conductive material is employed as the first underfill— in particular a material with an electrical resistance with values lying between around 100 kΩ and 1 MΩ. This enables a voltage drop to form at the edges of the respective sensor surface element. Because of this voltage drop the course of electric field lines at the edges (in particular in the depth direction) of the sensor surface elements can advantageously be smoothed (homogenized), whereby pixel errors can be reduced.

In particular, for the case in which the pixels are to be embodied on the sensor surface elements after the positioning of the sensor surface elements on the assembly carrier (and also optionally in which the sensor surface elements are moved against the installation strips for positioning), in a further expedient version the sensor surface elements are covered with a cover film, in particular before the placement of the interposer or of the respective interposers, preferably the cover film forming the previously mentioned so-called dry film. This cover film is put on in this case such that the gap between the sensor surface elements is covered. Preferably this cover film remains on the sensor surface elements, so that gaps between the sensor surface elements remain covered. This version is alternative or optionally additional to the introduction of the first underfill between the sensor surface elements. Through this cover film the penetration of the possibly further (second) underfill into the gap between the sensor surface elements will advantageously be prevented. Thus stresses caused by the second underfill can also be prevented by this cover film or at least reduced and signal instability can thus also be reduced.

Preferably the cover film described above represents a variant of the protective layer serving to lithographically embody the pixels and for this purpose is opened locally, in particular lithographically. Thus, through the use of the cover film, two tasks (namely the formation of a protective layer for the lithography and the covering of the gaps) can advantageously be covered by just one element.

Basically so-called "stud bumps" are used as contact elements on the respective interposer. Especially preferably however metal cylinders (or pillars), in particular so-called copper pillars, are embodied as contact elements on the interposer or the respective interposers. These in particular have an improved position tolerance compared to conventional stud bumps (in particular between one another). Optionally the copper pillars bear a contacting ball on their free-end side, through which a simplified embodiment of the contacting with the respective pixel is to be made possible.

In particular for the case of a number of interposers, these will be aligned with one another in an advantageous design in respect of the positioning accuracy via an assembly film. The assembly film in particular involves a film in which openings complementary to the arrays of contact elements, in particular holes, are introduced lithographically or using laser technology for example. These openings penetrate the contact elements arranged as per specifications (preferably the metal cylinders) of each interposer, so that each interposer is "latched in" on the assembly film in the surface direction. The assembly film is preferably subsequently used as a carrier, by which all interposers will be placed at their specified position on the sensor surface elements. The assembly film thus remains in this case between the respective interposer and the sensor surface elements.

In an optional development, at least one of the interposers is aligned uniquely to the openings in the assembly film via an individual arrangement (in concrete terms an individual pattern) of the contact elements, in particular of the metal cylinders on its mating contact surface and a complementary arrangement of the corresponding assembly film. The respective interposer is thus arranged on the assembly film according to a kind of "lock and key principle". Preferably the pattern of the contact elements is embodied in this case within the framework of an arrangement possible through the surface of the individual pixels (preferably larger by comparison with the adopted surface of the contact elements). In addition it is basically also conceivable that for example an individual contact element is left out (i.e. is missing on the respective interposer). Optionally the pattern of the contact elements is (also) embodied by leaving out a contact element.

Furthermore, in an optional version for simplified alignment of the respective interposer on the assembly film, air is blown in through its openings in particular up from an underside to facilitate movement of the respective interposer into its target position, so that the respective interposer is movably supported on an air cushion. As a further option no air is blown through the openings into which the interposer is to latch with its contact elements, so that the interposer automatically sinks into the openings.

In order to increase the torsional stiffness of the x-ray detector, against different material-related thermal expansions within the x-ray detector for example, the interposer or possibly the number of interposers is or are pre-installed in an installation frame that in particular is rigid by comparison with the interposer (optionally in addition to the alignment via the aforementioned assembly film). This pre-installation is preferably undertaken before the placement of the interposer or the respective interposers on the sensor surface elements. Moreover this also makes it possible to embody the cover element, in concrete terms the collective electronics, as a flexible printed circuit board.

In an expedient development a material with a comparatively low coefficient of thermal expansion (preferably less than 5 ppm/K) is employed as the material for the assembly frame, e.g. iron-nickel alloys, which are known inter alia under the brand names Kovar, Invar or the like.

Expediently the assembly frame has frame rails on the outside, which project in the placement direction in relation to the sensor surface elements. During placement of the assembly frame with the interposers fastened therein on the sensor surface elements, these frame rails are pushed laterally over the edges of the outer sensor surface elements (i.e. the sensor surface elements, which delimit the outer side of the sensor surface). This enables the outer edges of the sensor surface elements to be protected against damage from contact with other components. Expediently the frame rails—or at least one of the rails—is employed as a power feed for the voltage connection element or the respective voltage connection element arranged on the sensor surface elements in the specified final assembly state. A power feed via a flexible cable, which with kinked cables can lead to damage of the edges of the sensor surface elements, can thus advantageously be dispensed with.

In the case of a number of interposers, the assembly frame in particular has frame bars dividing up the inner surface of the assembly frame in a cross shape. An interposer is inserted in each case into each compartment formed by these frame bars and in this case is held on the surrounding frame bars and where necessary the outer main frame bars of the assembly frame.

In an expedient version a clamping plate is employed as the force transmission element to exert the assembly force for forming the contacting between the sensor surface elements and the respective interposer. This clamping plate is placed on the x-ray radiation side (in particular after the removal of the assembly carrier) on the sensor surface elements and preferably tensioned against the cover element. Preferably a material transparent to x-rays is used as the material for the clamping plate, for example a plastic such as polymethylmethacrylate or polycarbonate or a glass, so that the clamping plate can remain on the sensor surface elements where necessary. In an optionally alternative or additional development thereto the clamping plate will be removed again after the establishment of the contacting—preferably the press welding connection described above, in order to avoid a weakening of the x-ray radiation by the clamping plate during normal operation. In the latter case the clamping plate is optionally placed on the assembly carrier. Preferably the clamping plate is curved, so that a sufficiently high force for forming the electrical contacts can be applied to all sensor surface elements. Optionally the clamping plate bears the voltage connection element or the respective voltage connection element. For the case in which the clamping plate will be removed again after embodiment of the contacting between the respective interposer and the sensor surface elements, the clamping plate will be used in an optional variant, in order to arrange the voltage connection element on the sensor surface elements.

In an alternative and especially expedient version to the use of the clamping plate, a film is used as the force transmission element. By use of this film in this version first of all a fluid-tight packaging for a pre-assembly unit formed in particular from the sensor surface elements, the interposer or the respective interposers, the evaluation circuits and the cover element is formed. This fluid-tight packaging will subsequently have a vacuum applied to it, in particular be evacuated. The film thereby clings to the sensor surface elements or where necessary to the not yet removed assembly carrier and makes it possible to exert an even force over the full surface of the sensor surface elements. Local force peaks, because of uneven surfaces for example, can advantageously be avoided in this case. Moreover the value of the force can be controlled by variation of the vacuum value applied.

In an expedient development, the vacuum described here is used to introduce a second filler material (underfill) at least between the sensor surface elements and the interposer or the respective interposers. Preferably the second underfill actually involves an additional, further underfill, which is prevented by the first underfill—or optionally additionally by the dry film—from flowing into the gap between the sensor surface elements. This enables the (mechanical, in particular internal) stresses in the sensor surface elements caused by the shrinkage during processing of the second underfill to be reduced or prevented. Subsequently the second underfill is hardened. As an alternative only the second underfill is used, which can then flow into the gap or—if present—is advantageously prevented from doing so by the dry film. The second underfill serves in particular in the form of a gluing of the sensor surface elements with the respective interposer for mechanical stabilization of the contacting (in particular the press welding connection) between the sensor surface elements and the respective interposer. In this case, in an optional variant, the film described here for forming the fluid-tight packaging is removed again after the hardening of the second underfill. For the case in which the second underfill involves a material that hardens while emitting (mostly gas-generating) by-products (for example water, ammonia or the like) (for example a so-called polycondensate), during the hardening of the second underfill—in an oven for example—the vacuum continues to be maintained, in order in this way to be able to continuously discharge the by-products.

In an alternate variant, the second underfill is introduced independently of the use of the film described here as the force transmission element between the sensor surface elements and the respective interposer, using the capillary effect between these components for example. In particular the second underfill is expediently also employed when the clamping plate is used, so that the plate can advantageously be removed again after hardening of the second underfill and the sensor surface elements still have a sufficiently high cohesion to the interposer or to the respective interposers.

An embodiment of an inventive x-ray detector is produced according to an embodiment of the assembly method described above and thus has the features and also advantages described in conjunction with at least one embodiment of the inventive assembly method.

An embodiment of an inventive x-ray device, for example a C-arm x-ray device, has an embodiment of the x-ray detector described here. An embodiment of the inventive x-ray device also shares the features as well as the advantages described above in conjunction with an embodiment of the inventive assembly method.

Shown schematically in FIG. 1 is an example embodiment of an x-ray detector 1, which in concrete terms is embodied as a flat panel detector. The x-ray detector 1 comprise a number of sensor surface elements 4 arranged next to one another in an array (cf. also FIG. 2). These sensor surface elements 4 are embodied from an x-ray radiation direct-converting material, in concrete terms cadmium telluride. On a contact side 8 (see FIG. 3), opposite to an incident side 6 of the x-rays, a number of electrodes, which each represent a pixel 10, are arranged in the form of an array on the sensor surface elements 4. With incident x-ray radiation a charge carrier is formed in the respective sensor surface element 4, which as result of an extraction voltage applied on the incident side 6 and the contact side 8 of the sensor surface elements 4 migrates in the direction of the contact side 8. The extraction voltage in this case regularly has values in the range of around −1000 V. At the pixels 10 the charge carriers generated in the area of the sensor surface element 4 arranged above the respective pixel 10 can then be registered. This enables an especially high-resolution measurement signal to be generated for the incident x-ray radiation in the area of each of the pixels 10.

For registration of the charge carriers, and also for application of the extraction voltage—the pixels 10 of each of the sensor surface elements 4 are in contact for signal transmission with a respectively assigned evaluation circuit, here in concrete terms an ASIC 12. On the incident side 6 the sensor surface elements 4 are in contact with a voltage connection element 14, which serves to apply the extraction voltage. Since the ASICs 12, seen in the surface direction 16 of the x-ray detector 1, are smaller than the sensor surface elements 4, an interposer 18 is connected between the sensor surface elements 4 and the ASICs 12 for contacting the input channels of each of the ASICs 12 assigned to the respective pixels 10. For simplified assembly, in the example embodiment depicted in FIG. 1, two interposers 18 are arranged next to one another in the direction of the surface of the drawing sheet. Each of the interposers 18, on a mating contact side 20 facing towards the contact side 8 of the sensor surface elements 4 in the normal final assembly state, bears a number of contact elements 22, which are each assigned to the pixels 10. Via these contact elements 22, in the final assembly state as per specifications (cf. FIG. 1), the pixel 10 is in contact for signal transmission in each case with the respective assigned ASICs 12. In order to be able to forward the measurement signals acquired and pre-processed via the ASICs 12 to an evaluation unit superordinate to the x-ray detector 1, the respective ASICs 12 are in contact for signal transmission with and are covered by collective electronics 24 (which form an underside cover element).

In order to reduce the size of (assembly) gaps 26, which occur between the respective sensor surface elements 4 as a consequence of production, and thus where necessary to avoid or at least to reduce x-ray image artifacts or blind spots on the detector caused by too large a gap 26, an assembly method described in greater detail below for production of the x-ray detector 1 is carried out. In concrete terms in this method the respective sensor surface elements 4 are not connected to the respective ASIC 12 by soldering them to a subunit (hybrid) and subsequently installed on the collection electronics 24. This is because, with the production tolerances occurring during a soldering process, gap dimensions for the gap 26 of for example below 40 μm cannot be adhered to with sufficient certainty or only at great expense. Instead the sensor surface elements 4 are initially positioned and fixed with their incident side 6 on an assembly carrier 30. Subsequently the interposers 18 are placed on the sensor surface elements 4 (cf. FIG. 3). The contacting between the interposers 18 and the sensor surface elements 4 is undertaken in the example embodiment depicted in FIG. 1 by a pre-installation unit formed by the voltage connection element 14, the sensor surface elements 4, the interposers 18, the ASICs 12 and the collective electronics 24 being pressed together by a clamping plate 32. In this case there is mostly a deformation of the contact elements 22 on the pixels 10, whereby a sufficiently good electrical contacting is actually made by a press welding connection. A solder process, with the associated risk that the contact elements 22 will move in relation to the pixels 10 in the surface direction 16, can thus be reduced. Moreover the sensor surface elements 4 can be arranged independently of the interposers 18 and thus also with an especially small gap dimension between them on the assembly carrier 30.

As is shown in greater detail in FIG. 3, the contact elements 22, seen in the surface direction 16, have smaller external dimensions than the pixels 10. This in its turn makes it possible to cater for positional tolerances of the contact elements 22 and/or of the pixels 10 and to facilitate a sufficiently precise contacting of the individual contact elements 22 with the respective pixels 10 assigned according to specification. The contact elements 22 alternatively involve so-called stud bumps (made of gold) or copper pillars. The latter have the advantage that they can be produced and positioned with significantly smaller tolerances compared to the stud bumps.

For fixing and for protection of the contacts between the contact elements 22 and the pixels 10, after the tensioning of the clamping plate 32 (in concrete terms against the collective electronics 24) a filler material referred to as underfill 34 is introduced between the sensor surface elements 4 and the interposers 18 and is subsequently hardened. This underfill 34 glues the sensor surface elements 4 and the interposers 18 to one another. In an optional example embodiment this also enables the clamping plate 32 to be removed again after the hardening of the underfill 34.

Figure 4:
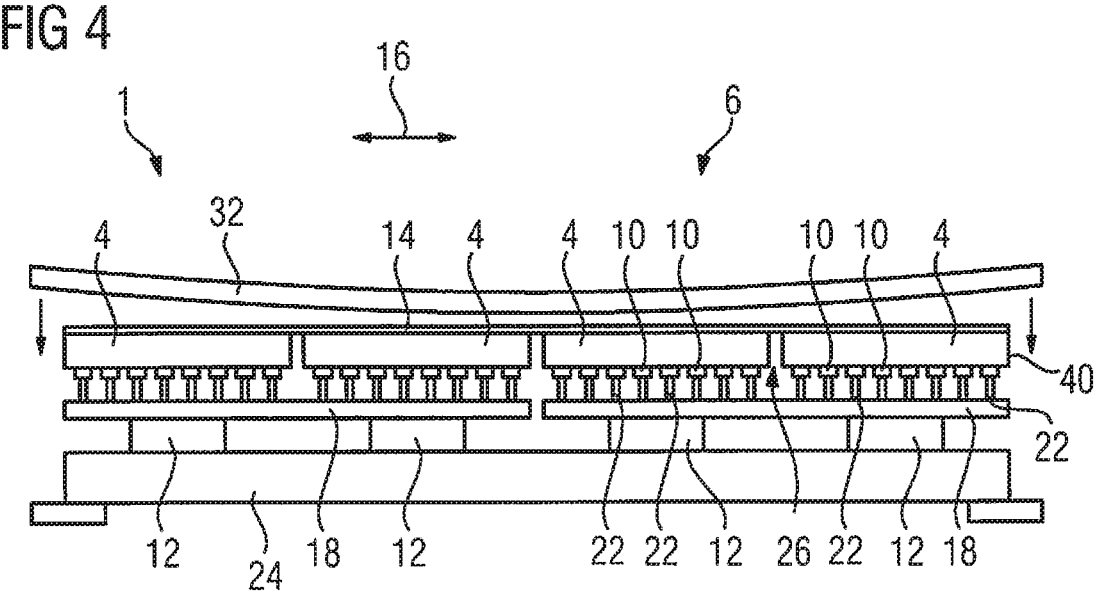
FIG. 4 shows, in a view as depicted in FIG. 1, the x-ray detector once again in a further partly assembled state.

Shown in greater detail in FIG. 4 is the assembly step of tensioning the clamping plate 32. The clamping plate 32 in this case is curved away from at least two opposite ends of the sensor surface elements 4, so that during tensioning of the clamping plate 32, the plate is applied in turn to all sensor surface elements 4 and exerts a sufficient installation force to form the contacting between the contact elements 22 and the pixels 10.

In the example embodiment shown in FIG. 2 the respective sensor surface elements 4 are already provided in advance with the respective pixel array (in FIG. 2, by way of example, only one sensor surface element 4 with its pixels 10 is shown). Because of positional fluctuations between the individual sensor surface elements 4, this can result in distortions being produced of the pixel columns and pixels rows running over the respective sensor surface elements 4.

Figure 5:
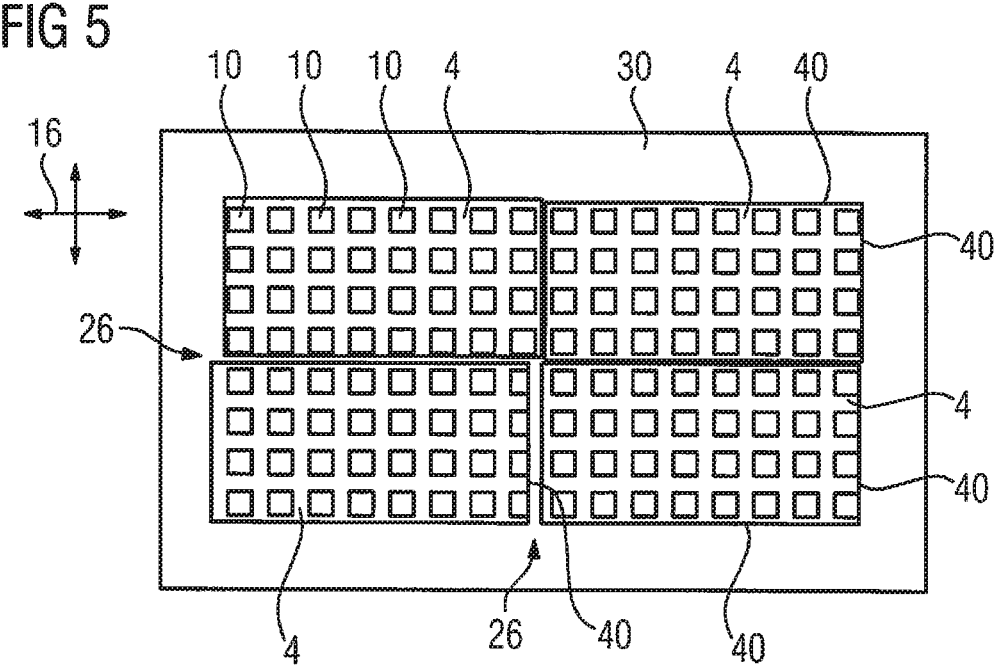
FIG. 5 shows, in a view as depicted in FIG. 2, an alternate example embodiment for production of the x-ray detector.

In an alternate example embodiment of the installation method (see FIG. 5) the pixels 10 will therefore only be put onto the respective sensor surface elements 4 after the positioning of the sensor surface elements 4 on the assembly carrier 30. The pixels 10 in this case are created with a "global" grid extending over all sensor surface elements 4. Thus all pixel columns and pixel rows extending over the entire x-ray detector 1—at least within the framework of the production tolerances for the pixels 10—can run in a straight line. Moreover FIG. 5 shows by way of example and greatly exaggerated, a production and positioning accuracy of the individual sensor surface elements 4. Because of different sizes (i.e. external dimensions) of the respective sensor surface elements 4 and also because of positioning fluctuations during placement of the components on the assembly carrier 30 the gap dimensions of the gap 26 running between the sensor surface elements 4 also vary. Because of the fixed (global) pixel grid the result can thus be that some pixels 10 on an outer edge 40 of an individual sensor surface element 4 itself are "cut off", i.e. not embodied with a full surface. This is shown exaggerated in FIG. 5 for the sensor surface illustrated on the bottom left element 4. However trials have shown here that pixels 10 reduced by 50%, but at least by a maximum of 20-30%, can deliver an adequately high signal level for a sufficient image quality.

Figure 6:
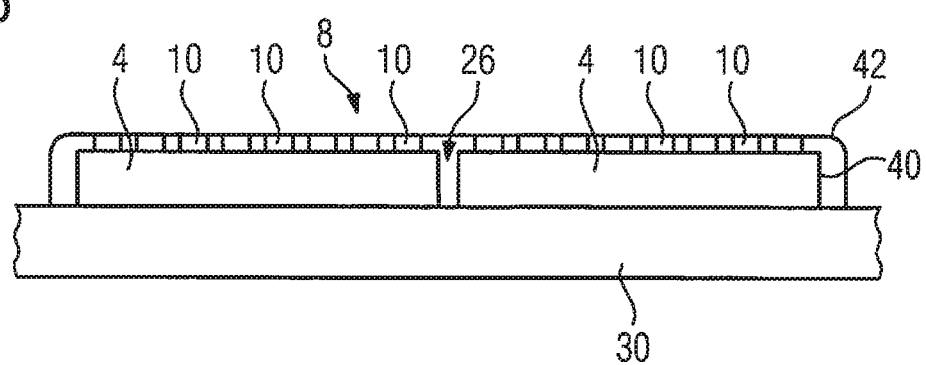
FIGS. 6 and 7 show, in a view as depicted in FIG. 3, two alternate example embodiments for formation of pixels on the sensor surface elements.

FIG. 6 shows the (retroactive) embodiment of the pixels 10 in greater detail. The pixels 10 are embodied lithographically here. This means that initially a lithography lacquer 42 is put onto the sensor surface elements 4 and subsequently is lithographically opened at the target positions of the individual pixels 10, in concrete terms is etched free. Then, on the contact surface 8 of the respective sensor surface element 4 revealed by this process, the respective pixel 10 is embodied by an electroless deposition method by a metallic layer (in concrete terms a so-called under bump metallization. After embodiment of the respective pixel 10 the lithography lacquer 42 is removed from the sensor surface elements 4 and where necessary also from the assembly carrier 30. In an example embodiment not shown in any greater detail, a wetting of the outer edges of the sensor surface elements 4 with the lithography lacquer 42 is prevented via a covering or a coating for example.

Figure 7:
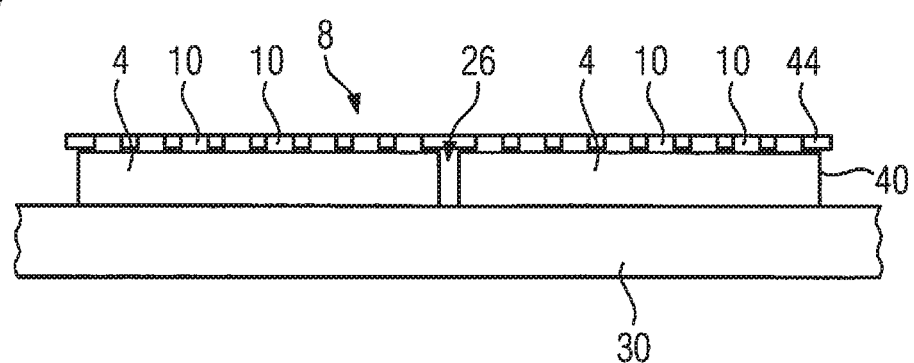

In an alternate example embodiment shown in greater detail in FIG. 7, instead of the lithography lacquer 42, a covering film referred to as a "dry film 44" is put onto the sensor surface elements 4. The individual pixels 10 are also embodied in this example embodiment lithographically in accordance with the example embodiment depicted in FIG. 6. The dry film 44 is however left on after the embodiment of the pixels 10 on the sensor surface elements 4, so that the dry film 44 prevents the gap 26 being filled later with the underfill 34.

Shown in FIG. 8 is a flow diagram of an example embodiment of the assembly method. In an example embodiment of FIG. 8, an inventive assembly method S100 for the production of an x-ray detector is shown. In an example embodiment, at the start, the assembly method includes a first step S101 of positioning a plurality of sensor surface elements, formed from an x-ray radiation-sensitive material, on an assembly carrier. Thereafter, the assembly method includes a second step S102 of placing an interposer on a contact side of each of the plurality of sensor surface elements, divided into a plurality of pixels and arranged opposite the assembly carrier, such that respective contact elements arranged on a mating contact side of the interposer, facing towards respective ones of the plurality of sensor surface elements, each contact a pixel. Thereafter, the assembly method includes a third step S103 of respectively putting an evaluation circuit on a circuit side of the interposer, opposite to the mating contact side of the interposer, for each respective sensor surface element of the plurality of sensor surface elements. That ends the an example embodiment of the inventive assembly method S100 for the production of an x-ray detector.

Figure 9A:
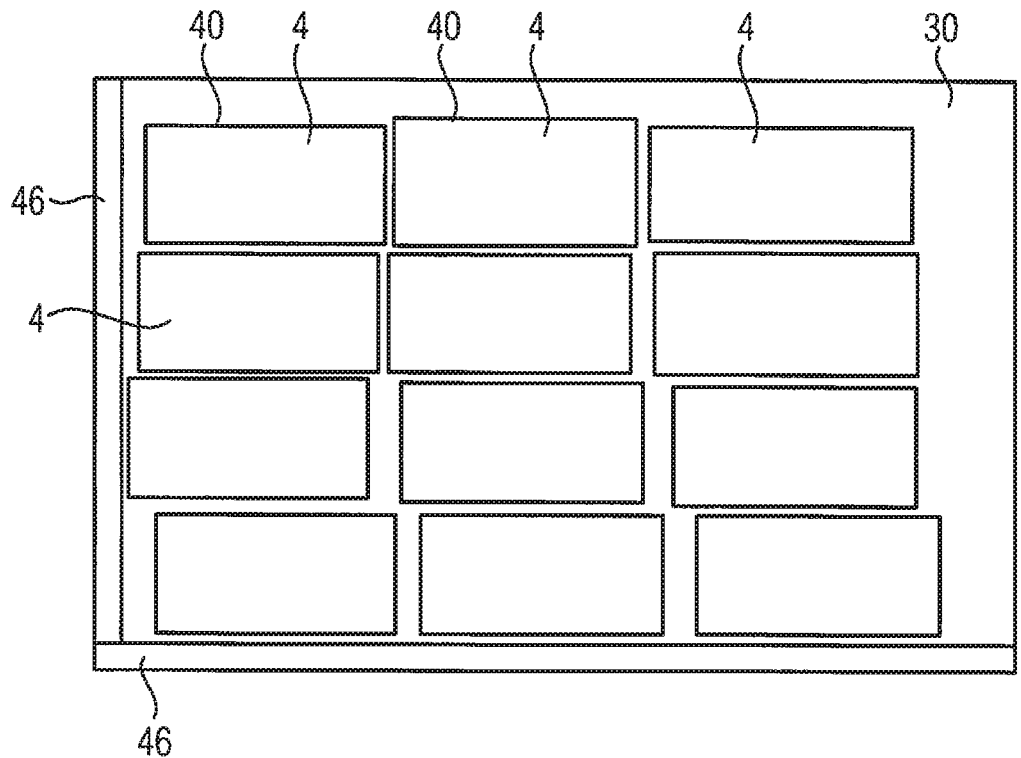
FIGS. 9A and 9B show, in a view as depicted in FIG. 2, a further example embodiment for assembly of the x-ray detector.
Figure 9B:
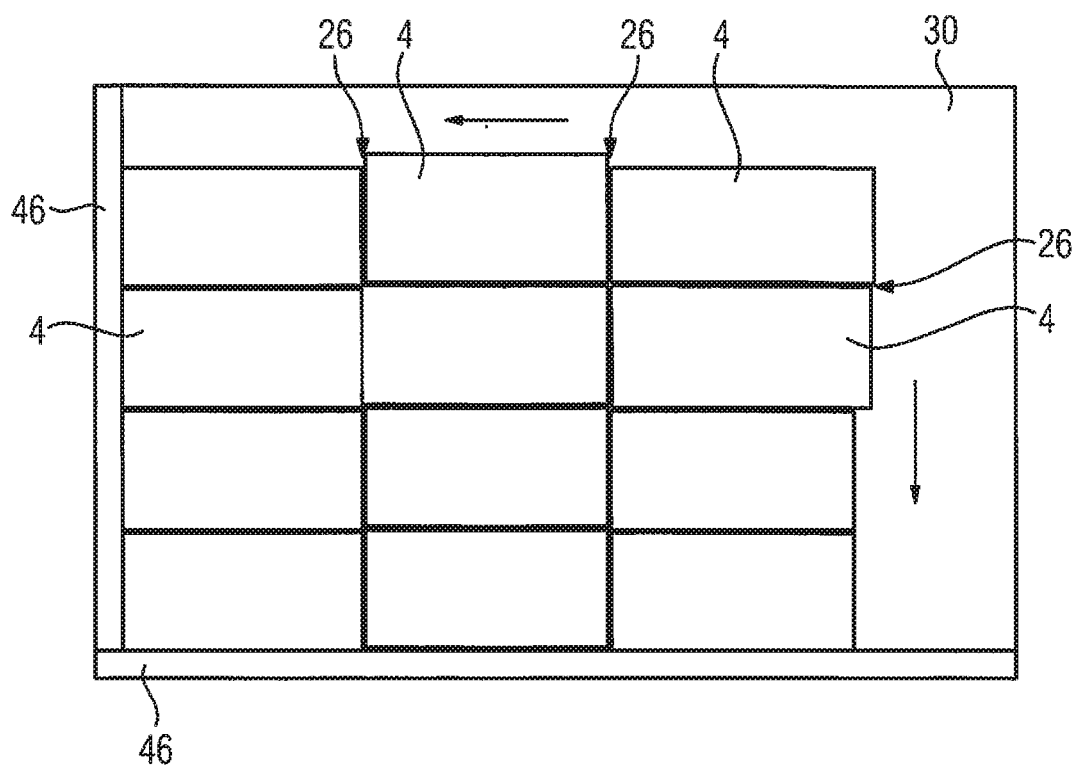

Shown in FIGS. 9A and 9B is a further example embodiment of the assembly method, in concrete terms of the process step for positioning of the individual sensor surface elements 4 on the assembly carrier 30. The assembly carrier 30 in this case has two assembly strips 46 at right angles to one another, which serve in each case as a stop edge for the sensor surface elements 4. The sensor surface elements 4 here are cut into shape (preferably by a sawing process) measured in relation to their outer dimensions (i.e. length and width) and pre-sorted via a sorting algorithm such that, on appropriate placement of the sensor surface elements 4 on the assembly carrier 30, a coverage of the fullest surface possible of the entire surface as per specification is produced. After the placement of the individual sensor surface elements 4 (in accordance with the pre-sorting) these are pushed against the two assembly strips 46. This aligns the sensor surface elements 4 automatically to one another, so that especially small gap dimensions are set for the gap 26. To move the sensor surface elements 4 the assembly carrier 30—as indicated by the two arrows in FIG. 9B—will be tilted in the direction towards the two assembly strips 46. In order to make possible an especially smooth sliding of the sensor surface elements 4 on the assembly carrier 30, the sensor surface elements 4 lie on a fluid, in concrete terms on a liquid or on an air cushion blown in through corresponding holes in the assembly carrier 30. The liquid can rise into the gap 26 in this case and on movement of the sensor surface elements 4 can also prevent the outer edges 40 from hitting each other, or at least damp the movement.

In an example embodiment not shown in any greater detail, the liquid used for moving the sensor surface elements 4 is formed by a wetting (hardenable) material, for example an epoxy resin, by which a fixing of the sensor surface elements 4 to each other by the liquid rising into the gap 26 is made possible. In this case this liquid forms a further underfill 48 (cf. FIG. 14). Underfill 48 that has flowed onto the flat sides of the sensor surface elements 4 is optionally removed after it has hardened.

In a further example embodiment not shown in any greater detail the assembly carrier 30 of the example embodiment in FIGS. 8 and 9 is replaced by an intermediate carrier. The sensor surface elements 4 are thus first moved for alignment on this intermediate carrier and subsequently in the aligned state are transferred to the assembly carrier 30.

Figure 10:
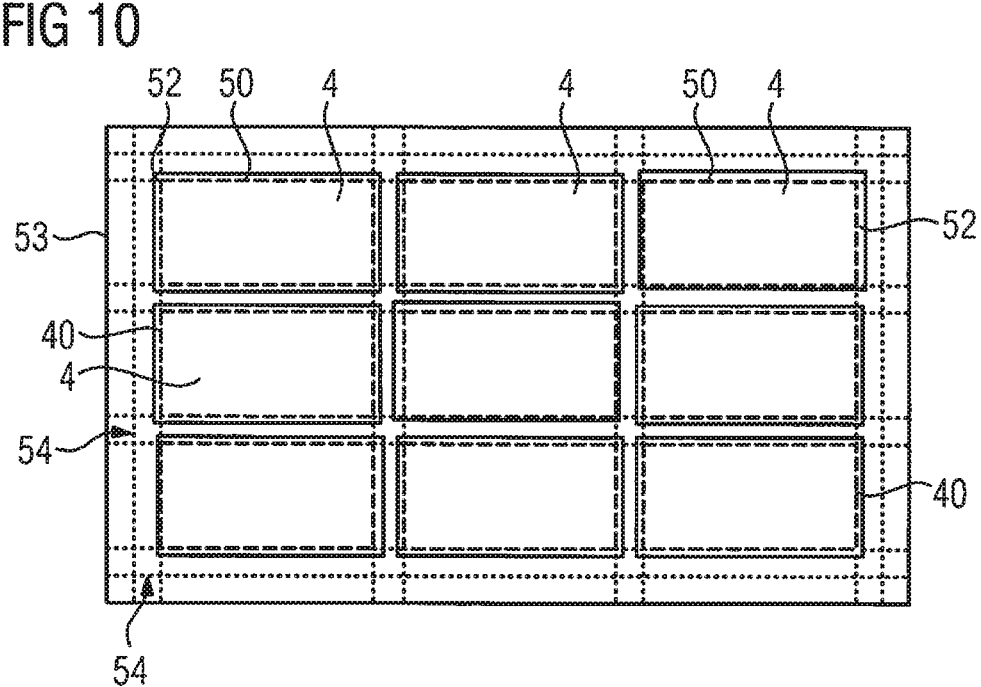
FIG. 10 shows, in a view as depicted in FIG. 2, once again a further example embodiment for assembly of the x-ray detector.

In a further example embodiment of the positioning step of the sensor surface elements 4 on the assembly carrier 30 the sensor surface elements 4 are not measured and pre-sorted as previously described. Instead the sensor surface elements 4 are shaped in relation to their target measurements (indicated in FIG. 10 by long dashed frame lines 50) with a trimming excess 52. Subsequently the sensor surface elements 4 are positioned on a sawing jig 53 and subsequently trimmed. For trimming a saw is used, which is guided along sawing paths 54 (shown by dotted lines). The sensor surface elements 4 in this case are arranged so that the saw, when moving down a sawing path 54 running between two sensor surface elements 4, simultaneously trims two adjacent sensor surface elements 4. Through this production-related fluctuations are mapped during trimming diametrically opposed on the outer edges 40 of the two adjacent sensor surface elements 4. These two sensor surface elements 4 thus fit with their respective facing outer edges 40 almost exactly into one another. The sensor surface elements 4 trimmed in this way are then transferred in the same sequence to the assembly carrier 30 and aligned with one another by way of the positioning method described with reference to FIGS. 8 and 9—with the pre-sorting omitted. This enables the gap 26 arranged between the individual sensor surface elements 4 to be further reduced.

Figure 11:
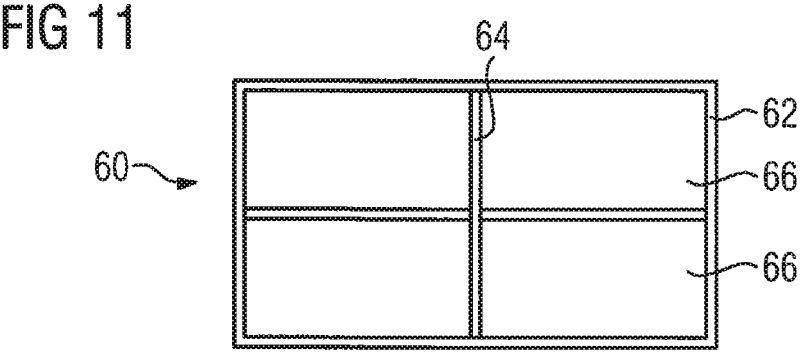
FIGS. 11 and 12 show, in a view as depicted in FIG. 2 or 1 respectively, a further example embodiment for assembly of the x-ray detector.
Figure 12:
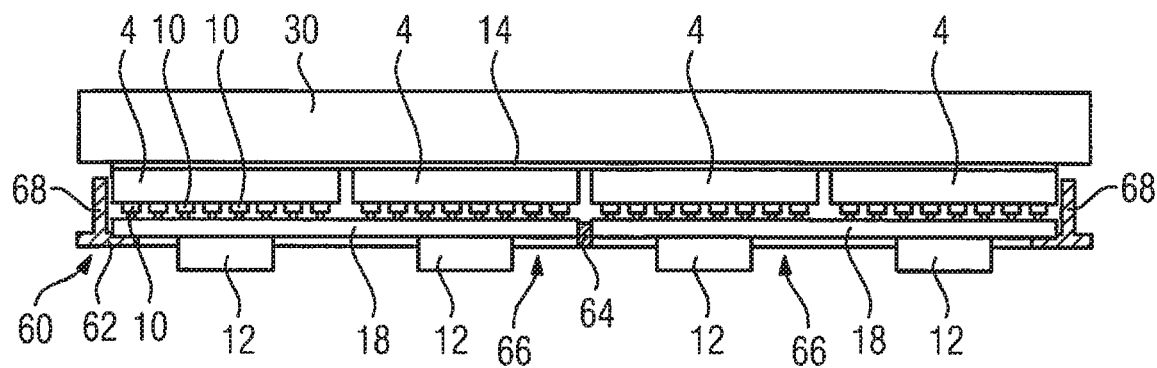

Shown in FIGS. 11 and 12 is an example embodiment for alignment of the interposers 18 in relation to one another. In this case an assembly frame 60 is used, in which the individual interposers 18 are pre-installed. The assembly frame 60 in this case has an annular rectangular closed main frame web 62 running around its outer edge, on which two crossing frame bars 64 are arranged in the inner side. In this case the frame bars 64 divide up the inner surface of the assembly frame 60 into a number (four in the present example embodiment as depicted in FIG. 11) frame compartments 66. An interposer 18 is placed in these frame compartments 66 in each case and fastened to the frame bars 64 and to the main frame web 62 (cf. FIG. 12). Moreover frame strips 68 are also embodied on the main frame web 62, which project in an annular circumferential direction in the specified pre-installation state (cf. FIG. 12) in the direction towards the sensor surface elements 4. The frame strips 68 in this case form an alignment aid for aligning the assembly frame 60 in relation to the sensor surface elements 4. In addition the frame strips 68 also form an edge protection for the sensor surface elements 4 in the final assembly state as per specification. The assembly frame 60 is formed from a metal alloy with a low coefficient of thermal expansion. This enables the assembly frame 60 to contribute to the stable shape of the x-ray detector 1 even with variable usage temperatures. Furthermore the collective electronics 24, because of the rigidity of the assembly frame 60, can also be embodied by a flexible printed circuit board, without any adverse effects on the stability of the x-ray detector 1 as a whole occurring.

In an optional example embodiment (not shown in any greater detail) at least one of the frame strips 68 is employed for contacting the voltage connection element 14. A separate, cabled power feed to the voltage connection element 14 can thus be dispensed with.

Figure 13:
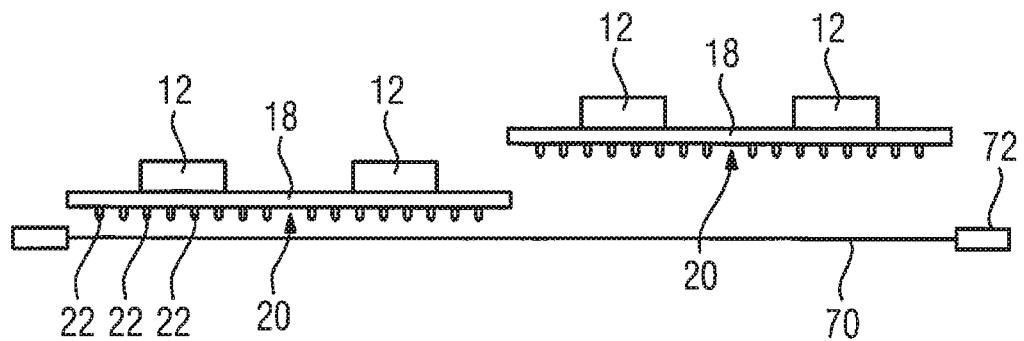
FIG. 13 shows, in a view as depicted in FIG. 1, an alternate example embodiment for assembly of the x-ray detector.

Shown in FIG. 13 is an alternate example embodiment for positioning and alignment of the interposers 18. The interposers 18 are placed in this case with their contact elements 22—which in this example embodiment are actually formed by the copper pillars—on an assembly film 70. Inserted in this assembly film 70 (which is tensioned via a tensioning frame 72) are openings corresponding to the contact elements 22 (in concrete terms: holes). These holes are inserted into the assembly film 70 in this case by high-precision production techniques such as for example laser beam drilling or etching methods. This enables the individual interposers 18 to be arranged and aligned with high precision and at small distances from one another on the assembly film 70. In an optional variant of this example embodiment at least some of the contact elements 22 of an interposer 18 are arranged in an individual pattern on the mating contact surface 20 of the interposer 18. Accordingly holes allocated to the specific interposer 18 are also arranged in the assembly film 70 with this individual pattern. This produces a unique positioning and alignment for each individual interposer 18 on the assembly film 70. For alignment of the respective interposer 18 on the assembly film 70, air is blown in through the holes in the assembly film 70 for example, so that the respective interposer 18 lies on an air cushion and thus can be moved especially smoothly. In the area in which the respective interposer 18 with its contact elements 22 is to sink into the assigned holes of the assembly film 70, air will no longer be blown in through the corresponding holes in this case.

Figure 14:
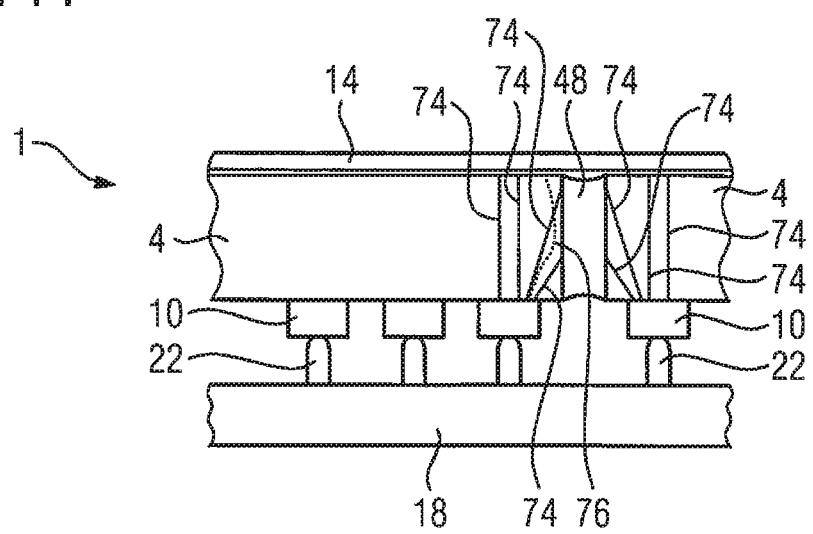
FIG. 14 shows, in a view as depicted in FIG. 3, a further example embodiment of the x-ray detector.

Shown in FIG. 14 is a further example embodiment of the x-ray detector 1. The underfill 48 introduced between the individual sensor surface elements 4 (which is intended to prevent the underfill 34 flowing into the gap 26 between the sensor surface elements 4) is an electrically conductive material in this case, in concrete terms formed by an epoxy resin filled with electrically conductive particles. Electrical field lines 74 of the extraction voltage applied between the voltage connection element 14 and the interposer 18 can in this way be "homogenized" in the edge area of the individual sensor surface elements 4. Otherwise, as a result of production-related edge defects of the sensor surface elements 4, field lines 76 close to the edge (shown by a dotted line) can have an irregular course, which in its turn can influence the measurement result.

Figure 15:
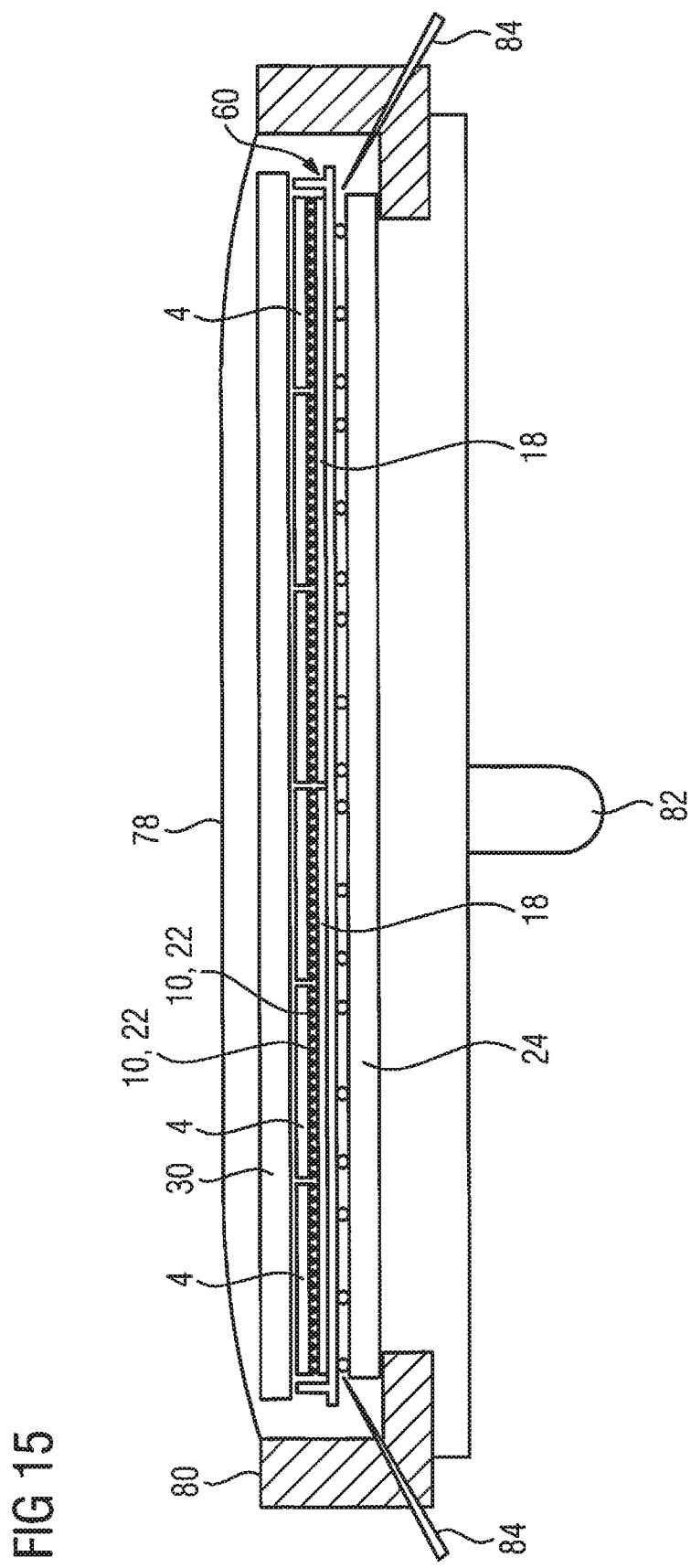
FIG. 15 shows, in a view as depicted in FIG. 1, an alternate example embodiment for assembly of the x-ray detector.

Shown in FIG. 15 is a further example embodiment for embodying the contacting between the sensor surface elements 4, in concrete terms their pixels 10 and the contact elements 22 of the interposer 18. Instead of being applied via the clamping plate 32 of the example embodiment depicted in FIG. 1 to 5, the assembly force required for embodying the contacting is applied via a film 78. A pre-assembly unit formed from the assembly carrier 30, the sensor surface elements 4, the interposers 18 and the collective electronics 24 is placed in this case in a pot-like retaining frame 80. This retaining frame 80 is sealed with the film 78 to form a fluid-tight package. Subsequently the interior of the package is evacuated via a vacuum pump 82. This causes the film 78 (not shown in any greater detail) to cling to the full surface of the assembly carrier 30 and to exert an even force on the assembly carrier 30 over the entire surface of the assembly carrier 30. The value of this assembly force exerted can in this case be controlled by the value of the vacuum applied via the vacuum pump 82. In the example embodiment shown in FIG. 15 the interposer 18 is arranged in the assembly frame 60. The method of operation shown in FIG. 15 can however be readily applied to all example embodiments described herein.

The vacuum applied in the interior of the package is also used, after the embodiment of the contacting, to fill the voids between the interposers 18 and the sensor surface elements 4 and also between the interposers 18 and the collective electronics 24 with the underfill 34. For this purpose the retaining frame 80 is in particular penetrated by a number of underfill inflow channels 84, which make it possible, as a kind of pipette to supply the underfill 34 at the requested points of the pre-assembly unit.

Figure 16:
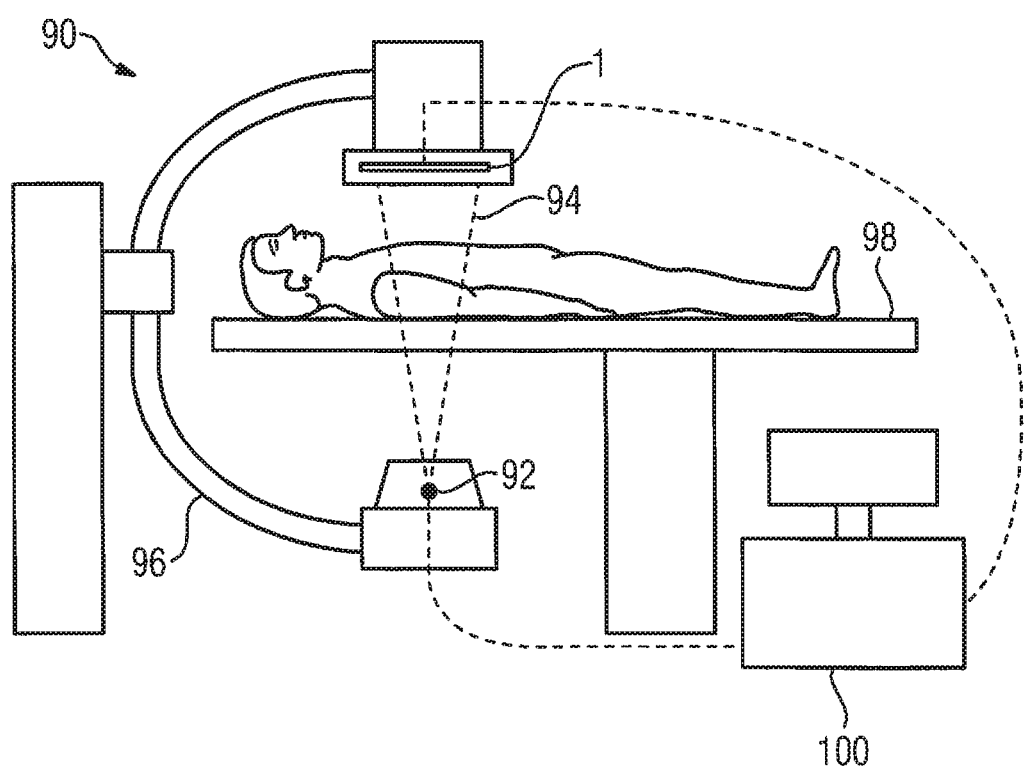
FIG. 16 shows, in a schematic diagram, an x-ray device with the x-ray detector.

Shown in FIG. 16 is an x-ray device 90, in concrete terms a C-arm device. This has an x-ray source 92, which emits x-ray radiation 94 during operation of the x-ray device 90. Mounted on a C-arm 96 of the x-ray device 90 opposite the x-ray source 92 is the x-ray detector 1. The x-ray source 92 and the x-ray detector 1 are arranged movably via the C-arm 96 relative to a patient couch 98. To evaluate the x-ray radiation detected via the x-ray detector 1 (in concrete terms the measurement signals pre-processed via the ASIC 12) the x-ray detector 1 (in concrete terms the collective electronics 24) is connected to a control processor, also referred to as an image processor 100, which forms the superordinate evaluation unit described above, for signal transmission. To control the x-ray source 92, the source is also connected to the image processor 100.

The subject matter of the invention is not restricted to the example embodiments described here. Instead further forms of embodiment of the invention can be derived from the present description by a person skilled in the art. In particular the individual features of the invention and their embodiment variants described on the basis of the different example embodiments can also be combined with one another in another way.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An assembly method for production of an x-ray detector, the assembly method comprising:
   positioning a plurality of sensor surface elements, formed from an x-ray radiation-sensitive material, on an assembly carrier;
   placing an interposer on a contact side of each of the plurality of sensor surface elements, divided into a plurality of pixels and arranged opposite the assembly carrier, such that respective contact elements arranged on a mating contact side of the interposer, facing towards respective ones of the plurality of sensor surface elements, each contact a pixel; and
   respectively putting evaluation circuits on a circuit side of the interposer, opposite to the mating contact side of the interposer, for each of the plurality of sensor surface elements, wherein a filler material is at least introduced between the plurality of sensor surface elements and the interposer;
   placing, on the circuit side of the interposer, a cover element covering over the evaluation circuits;
   removing the assembly carrier;
   putting a force transmission element onto one of the plurality of sensor surface elements or the assembly carrier; and applying, via the force transmission element, an assembly force to the plurality of sensor surface elements for embodying an electrically conductive connection to the interposer.

2. The assembly method of claim 1, wherein the placing of the interposer on a contact side of each of the plurality of sensor surface elements, is achieved without soldering.

3. The assembly method of claim 2, further comprising:
placing, on the circuit side of the interposer, a cover element covering over the evaluation circuits;
removing the assembly carrier; and
putting a force transmission element onto one of the plurality of sensor surface elements or the assembly carrier; and
applying, via the force transmission element, an assembly force to the plurality of sensor surface elements for embodying an electrically conductive connection to the interposer.

4. The assembly method of claim 2, wherein a voltage connection element is applied to the plurality of sensor surface elements via the assembly carrier.

5. The assembly method of claim 2, wherein the interposer covers a number of the plurality of sensor surface elements.

6. The assembly method of claim 2, wherein respective evaluation circuits are installed on the interposer, before the placing of the interposer on the contact side of respective sensor surface elements.

7. The assembly method of claim 2, wherein respective evaluation circuits, viewed from a surface direction, are relatively smaller than the respective sensor surface elements.

8. The assembly method of claim 2, wherein gaps occurring between individual sensor surface elements, of the plurality of sensor surface elements, during the positioning of the plurality of sensor surface elements on the assembly carrier and before the placing of the interposer, are filled with a first, wetting filler material.

9. The assembly method of claim 1, wherein a voltage connection element is applied to the plurality of sensor surface elements via the assembly carrier.

10. The assembly method of claim 1, wherein the interposer covers a number of the plurality of sensor surface elements.

11. The assembly method of claim 1, wherein respective evaluation circuits are installed on the interposer, before the placing of the interposer on the contact side of respective sensor surface elements.

12. The assembly method of claim 1, wherein respective evaluation circuits, viewed from a surface direction, are relatively smaller than the respective sensor surface elements.

13. The assembly method of claim 1, wherein two assembly strips, each of the two assembly strips being adjacent to and aligned at an angle with another one of the two assembly strips, are arranged on the assembly carrier or on an intermediate carrier and, wherein the plurality of sensor surface elements are pushed against the two assembly strips.

14. The assembly method of claim 1, wherein die sensor surface elements are trimmed along outer edges such that two adjacent sensor surface elements, of the plurality of sensor surface elements, are simultaneously trimmed at outer edges facing towards another of the die sensor surface elements.

15. The assembly method of claim 1, wherein, after the positioning of the plurality of sensor surface elements on the assembly carrier the plurality of sensor surface elements are covered with a covering film.

16. The assembly method of claim 1, wherein metal cylinders are embodied as contact elements on the interposer.

17. The assembly method of claim 1, wherein a number of interposers are placed on the plurality of sensor surface elements and wherein respective interposers, of the number of interposers, are aligned to with other of the number of interposers, via an assembly film, the contact elements of each of the interposers penetrating through openings.

18. The assembly method of claim 1, wherein the interposer is pre- installed in an assembly frame.

19. The assembly method of claim 1, wherein a clamping plate is employed as the force transmission element, placed on an x-ray radiation side of the plurality of sensor surface elements or the assembly carrier, and tensioned against the cover element.

20. The assembly method of claim 1, wherein a film is employed as the force transmission element, the film being configured to form a fluid-tight package for a pre-installation unit formed from the plurality of sensor surface elements, the interposer, the evaluation circuits and the cover element, the method further comprising applying a vacuum to the fluid-tight package.

21. The assembly method of claim 20, wherein, using the vacuum, a second filler material is at least introduced between the plurality of sensor surface elements and the interposer.

22. An x-ray detector, produced by the assembly method of claim 1.

23. An x-ray device comprising:
the x-ray detector of claim 22.

24. An assembly method for production of an x-ray detector, the assembly method comprising:
positioning a plurality of sensor surface elements, formed from an x-ray radiation-sensitive material, on an assembly carrier;
placing an interposer on a contact side of each of the plurality of sensor surface elements, divided into a plurality of pixels and arranged opposite the assembly carrier, such that respective contact elements arranged on a mating contact side of the interposer, facing towards respective ones of the plurality of sensor surface elements, each contact a pixel; and
respectively putting evaluation circuits on a circuit side of the interposer, opposite to the mating contact side of the interposer, for each of the plurality of sensor surface elements, wherein a respective contact side of each of the respective sensor surface elements is only divided into the pixels after the positioning of the respective sensor surface elements on the assembly carrier.

25. An assembly method for production of an x-ray detector, the assembly method comprising:
positioning a plurality of sensor surface elements, formed from an x-ray radiation- sensitive material, on an assembly carrier;
placing an interposer on a contact side of each of the plurality of sensor surface elements, divided into a plurality of pixels and arranged opposite the assembly carrier, such that respective contact elements arranged on a mating contact side of the interposer, facing towards respective ones of the plurality of sensor surface elements, each contact a pixel; and respectively putting evaluation circuits on a circuit side of the interposer, opposite to the mating contact side of the interposer, for each of the plurality of sensor surface elements, placing, on the circuit side of the interposer, a cover element covering over the evaluation circuits;

removing the assembly carrier;

putting a force transmission element onto one of the plurality of sensor surface elements or the assembly carrier; and applying, via the force transmission element, an assembly force to the plurality of sensor surface elements for embodying an electrically conductive connection to the interposer, wherein gaps occurring between the-individual sensor surface elements, of the plurality of sensor surface elements, during the positioning of the plurality of sensor surface elements on the assembly carrier and before the placing of the interposer, are filled with a first, wetting filler.

26. An x-ray detector, produced by the assembly method of claim 25.

27. An x-ray device comprising:
the x-ray detector of claim 26.

28. The assembly method of claim 25, wherein a second filler material is at least introduced between the plurality of sensor surface elements and the interposer.

* * * * *